United States Patent [19]

Sing

[11] Patent Number: 4,766,708
[45] Date of Patent: Aug. 30, 1988

[54] SHOCK AND VIBRATION RESISTANT STRUCTURES

[76] Inventor: Peter Sing, 168-10 84th Ave., Jamaica, N.Y. 11432

[21] Appl. No.: 814,143

[22] Filed: Dec. 27, 1985

[51] Int. Cl.[4] .................... E02D 77/34; F16M 13/00
[52] U.S. Cl. .................................. 52/167; 52/79.12; 248/585; 248/621
[58] Field of Search .................. 52/167, 407, 79.12, 52/745; 248/562, 565, 621, 631, 636, 638, 585; 267/33, 8 R, 151, 152

[56] References Cited

U.S. PATENT DOCUMENTS

| | | | |
|---|---|---|---|
| 981,824 | 1/1911 | Veres | 52/167 |
| 1,240,521 | 9/1917 | Wendland | 243/621 |
| 1,501,583 | 7/1924 | Childs | 267/152 |
| 2,001,169 | 5/1935 | Wallace | 52/167 |
| 2,929,592 | 3/1960 | Spaetgens | 248/621 |
| 3,292,327 | 12/1966 | van der Lely | |
| 3,525,186 | 8/1970 | Lombardo | 52/79.12 X |
| 3,580,557 | 5/1971 | Dean | 267/33 |
| 3,643,390 | 2/1972 | Shelley | |
| 3,738,069 | 6/1973 | Navarrette-Kindelan | |
| 3,794,277 | 2/1974 | Smedley et al. | |
| 3,863,418 | 2/1975 | Faucheux | 52/79.12 X |
| 3,906,689 | 9/1975 | Nakayama | |
| 3,921,362 | 11/1975 | Cortina | 52/745 |
| 3,940,895 | 3/1976 | Yamamoto et al. | |
| 4,102,097 | 7/1978 | Zalotay | |
| 4,118,905 | 10/1978 | Shelley | |
| 4,164,149 | 8/1979 | Okubo | |
| 4,180,811 | 12/1979 | Yoshimura et al. | |
| 4,300,135 | 11/1981 | Korn et al. | |
| 4,343,460 | 8/1982 | Gende | 267/151 |
| 4,387,886 | 6/1983 | Schlegel et al. | 248/631 X |
| 4,472,916 | 9/1984 | Krebs | |
| 4,496,130 | 1/1985 | Toyama | 52/167 X |
| 4,514,942 | 5/1985 | Pocanschi | |
| 4,517,778 | 5/1985 | Nicolai | |
| 4,527,365 | 7/1985 | Yoshizawa et al. | |
| 4,533,109 | 8/1985 | Delam | |

FOREIGN PATENT DOCUMENTS 984959 7/1951 France ....................... 52/79.12

Primary Examiner—David A. Scherrel
Assistant Examiner—Richard E. Chilcot, Jr.
Attorney, Agent, or Firm—Nathaniel Altman

[57] ABSTRACT

A shock and vibration resistant structure includes a frame having a plurality of substantially rectangular regions therein. A plurality of modular units are received in the regions. The units have a lower external surface, side external surfaces, and a top external surface. A plurality of shock and vibration isolators extending from portions of the frame toward at least two adjacent external surfaces of the units, isolate the units from shock and vibration. The units are removable and replaceable. An elevator is used to lift the units so that they may be transferred horizontally from the elevator to the frame. Stabilizing members disposed between the units and the frame fall away when the structure is subjected to shock and vibration.

37 Claims, 5 Drawing Sheets

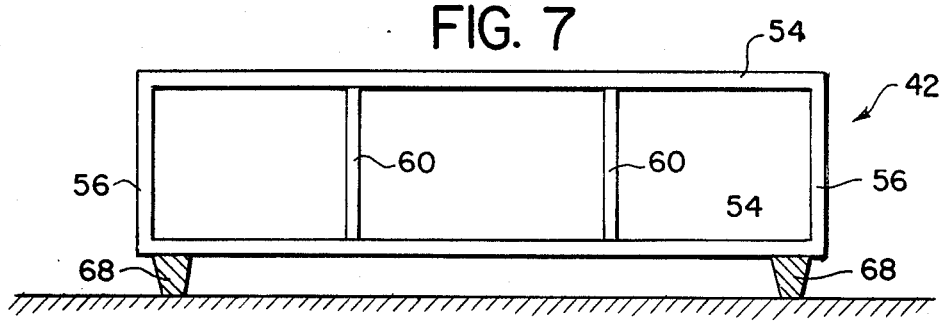
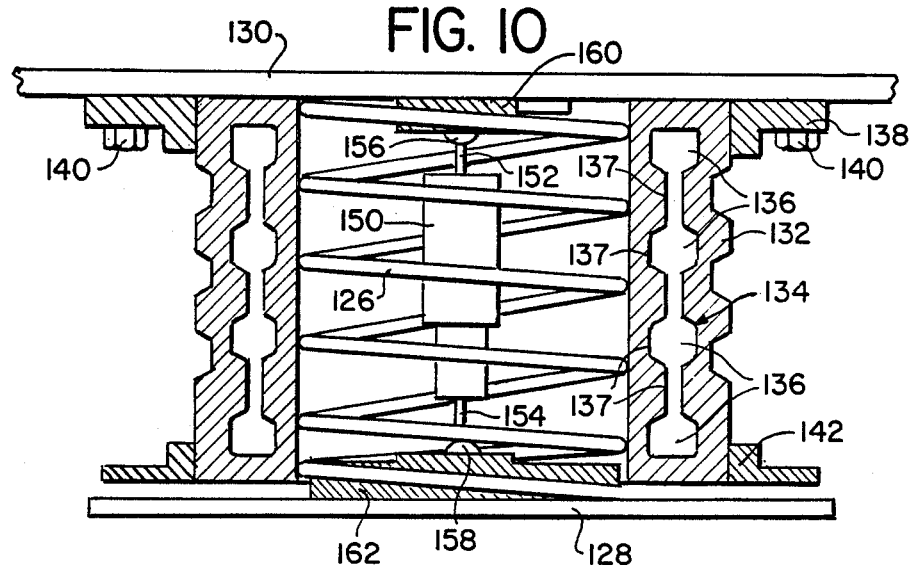
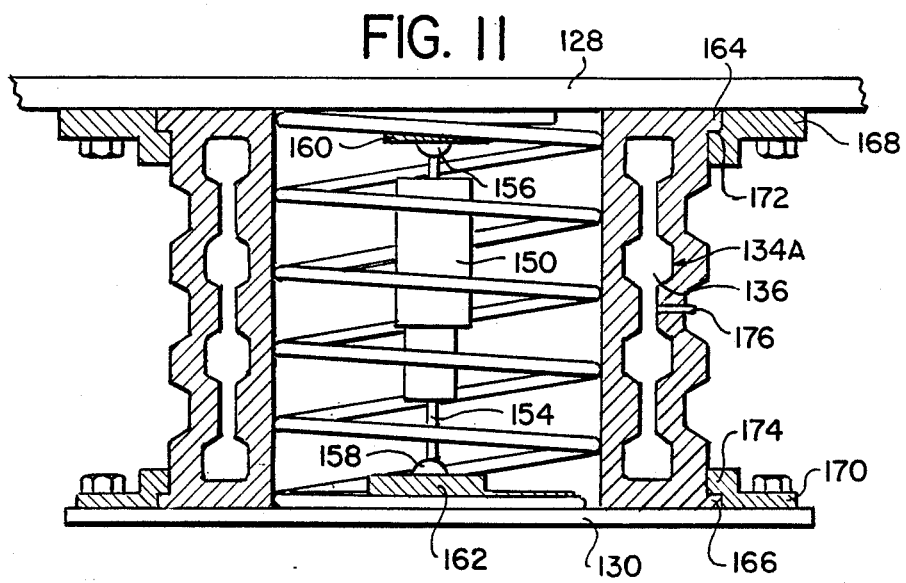

SHOCK AND VIBRATION RESISTANT STRUCTURES

BACKGROUND OF THE INVENTION

The present invention is generally directed to shock and vibration resistant structures and in particular to structures which are capable of withstanding shock and vibration caused by fairly large earthquakes.

Conventional building structures such as apartment houses and office buildings are made with heavy steel framework and with poured concrete. These structures, when subject to the typical stresses generated during earthquakes, tend to be torn apart thus creating heavy falling objects which cause further collapse of the structure or tend to injure or kill the occupants.

Conventional structures are also expensive to produce and do not generally lend themselves to production from prefabricated modular components. Instead, it is necessary to produce each structure as an almost custom made unit, thus making it difficult to realize economies of scale and requiring high labor costs for assembly due to the difficult nature of the assembly process.

Accordingly, there is a need for shock and vibration resistant structures which can withstand the forces of relatively severe earthquakes without producing large and heavy falling objects which tend to injure the occupants and cause additional damage to the structure. Further, there is a need for structures of this kind which can be assembled from inexpensive, prefabricated modular components so as to realize economies of scale and so as to provide rapid and easy assembly, thus reducing labor costs.

SUMMARY OF THE INVENTION

The invention is generally directed to shock and vibration resistant structures which can withstand the forces produced by a reasonably severe earthquakes. However, the modular construction of the present invention also lends itself to the inexpensive and rapid assembly of multiple dwellings structures from prefabricated modular components and is therefore also applicable to areas not subject to severe earthquakes.

The present invention is directed to a shock and vibration resistant structure built with a frame having a plurality of substantially rectangular regions therein. A plurality of modular living units are received in the regions. These units have a lower external surface, side external surfaces and a top external surface. A plurality of shock and vibration isolation means isolates the living units from shock and vibration. The shock and vibration isolation means extend from the frame toward at least two adjacent external surfaces of the unit.

In order to assure stability when there are at most, minor earth tremors, stabilizing members may be positioned so as to be trapped between the frame and the external surfaces of the living units. The stabilizing members are sized and shaped so that upon severe vibrations of the structure, the stabilizing members fall away from their initial positions thus leaving shock and vibration isolation units to absorb the shock and vibration of earthquakes sufficient in strength to dislodge the stabilizing members.

Accordingly, it is an object of this invention to provide an improved modular construction for multiple dwellings.

Another object of the invention is to provide a shock and vibration resistant structure suitable for use in areas of the world subject to relatively severe earthquakes.

A further object of the invention is to provide shock and vibration absorbing members suitable for isolating living areas from the frame of a multiple dwelling structure. Yet another object of the invention is to provide a method of assembling a structure having a frame and a plurality of modular living units wherein the structure is assembled by causing the living units to slide horizontally into regions of the frame.

A further object of the invention is to provide modular living units having removable panels along the side, top and bottom thereof so that the units can be interconnected to form living areas having various sizes and shapes.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is an enlarged partial cross-sectional view of a component of the invention taken along line 4—4 of FIG. 3;

FIG. 5 is an enlarged side elevational view of the component illustrated in FIG. 4;

FIG. 6 is a cross-sectional view of an alternate embodiment of the component illustrated in FIG. 4;

FIG. 7 is a schematic partial cross-sectional view of the embodiment of the invention illustrated in FIG. 1;

FIG. 10 is a cross-sectional view of an alternate embodiment of a component for use with the invention illustrated in FIG. 1;

FIG. 11 is an additional embodiment of a component for use with the invention of FIG. 1;

DETAILED DESCRIPTION OF THE PREFERRED EMBODIMENTS

The present invention is directed to structures produced from modular units that fit into a frame, but will be described specifically with reference to shock and vibration resistant structures of the type which may be used for a multiple dwelling.

Figure 1:
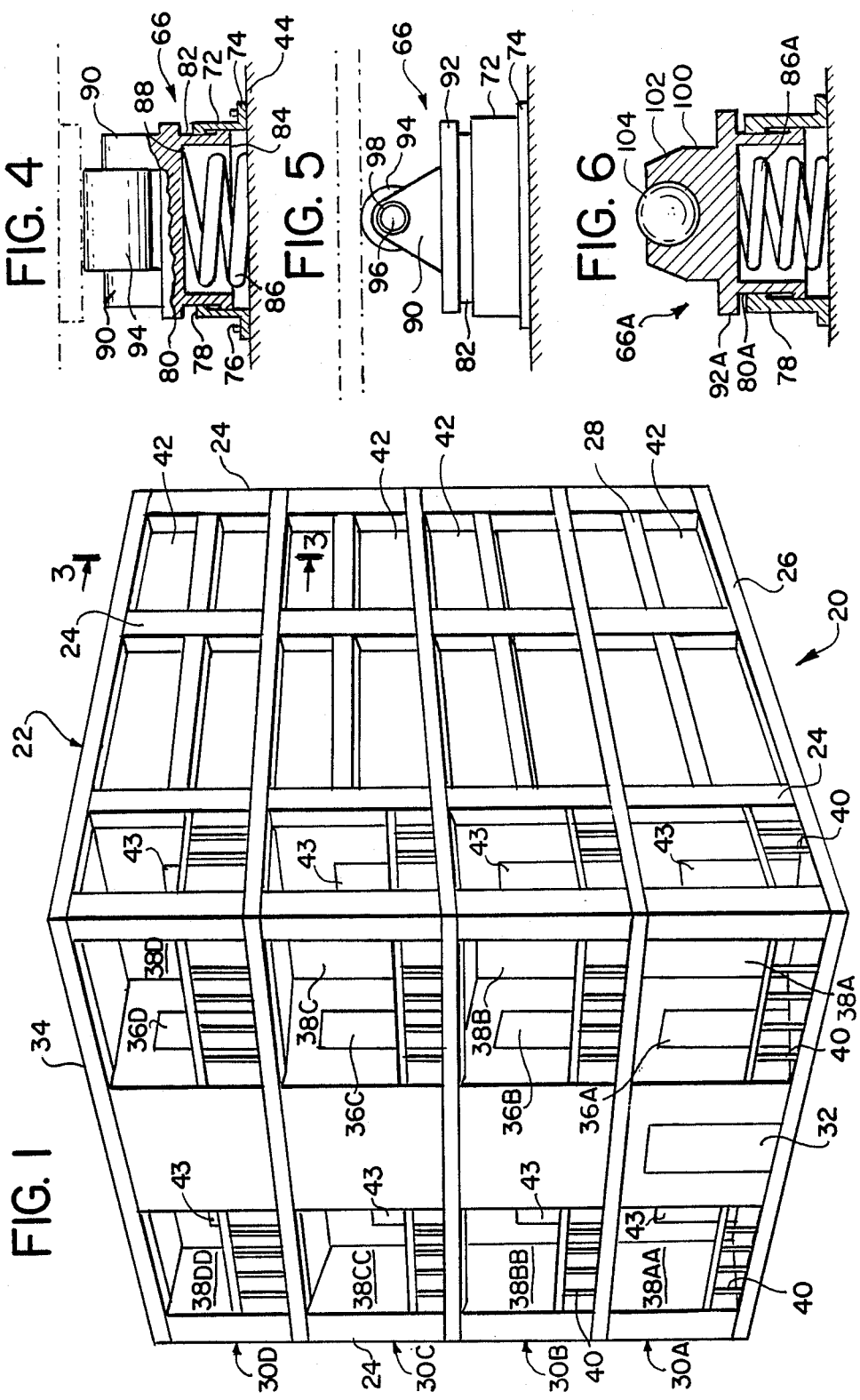
FIG. 1 is a perspective view of a structure in accordance with the present invention.

Reference is made to FIG. 1, wherein a multiple dwelling structure 20, in accordance with the invention, is illustrated. A metal framework shown generally at 22, is formed from a plurality of vertical columns 24 and horizontal beams 26. A plurality of short horizontal beams 28 may bridge spaces between adjacent vertical beams 24. Beams 24, 26 and 28 may be of any strong, tough metal, such as mild steel or aluminum alloy, depending upon the weight to be supported. Beams 24, 26, and 28 are assembled by conventional construction techniques such as bolting or welding in a manner well known in the art.

Structure 20 includes four levels 30A, 30B, 30C and 30D. A front door 32 provides an entrance to a stairwell 34 extending from the lower most level 38 to the upper most level 30D. A series of doors 36A, 36B, 36C and 36D, each open on to a respective terrace 38A, 38B, 38C and 38D enclosed, for safety, by railings 40. Corresponding doors (not shown) open on terraces 38AA, 38BB, 38CC, and 38DD.

A series of substantially identical modular living units 42 are placed in frame 22, in a manner more fully explained below. In all, frame 22 may accommodate a dozen full sized living units 42. On each level a unit is located behind each terrace and behind the stairwell 34. Thus, each level accommodates three living units 42 which are placed side by side within frame 22.

Each living unit has a front doorway 43 which either opens upon a respective terrace or upon a landing (not shown) of stairwell 34. The living units may be interconnected so that living areas of different sizes may be created, as more fully described below. This can be done using units 42 which are all of the same size or units of different sizes. For example, the entire living space in structure 20 may be divided into a larger number of living areas by using smaller units so that two units occupy, in tandem, the space occupied by one unit 42.

Figure 2:
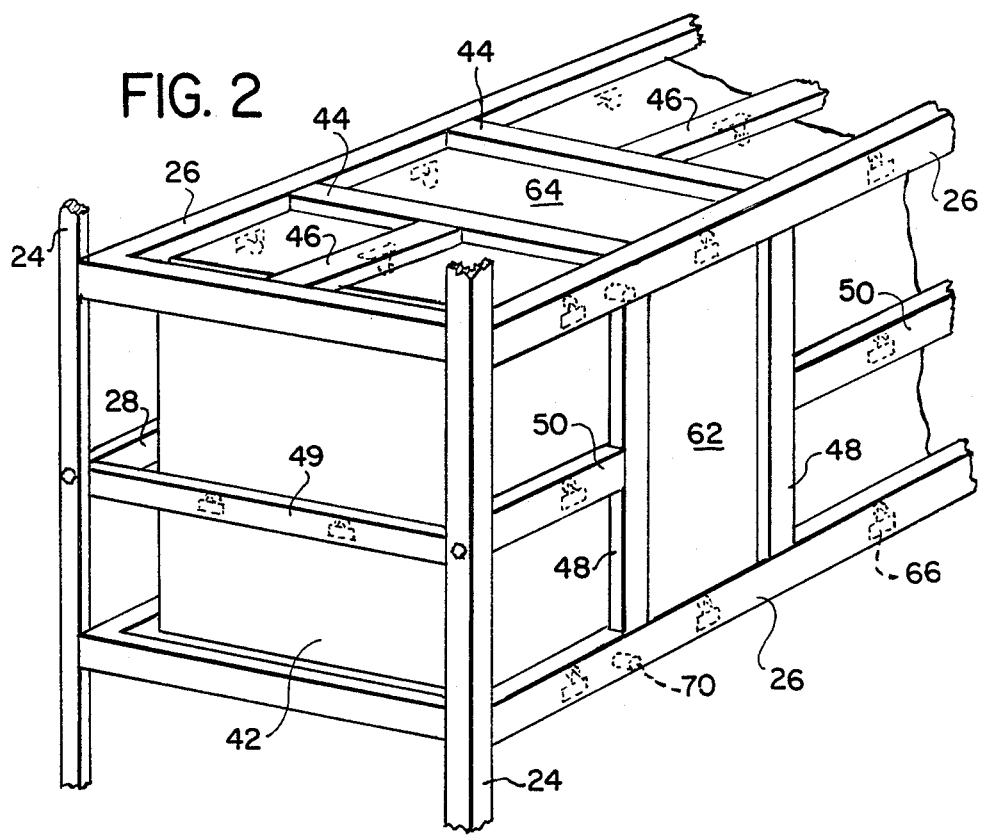
FIG. 2 is a perspective view of a portion of the structure illustrated in FIG. 1.

Referring to FIG. 2, the internal structure of frame 22 and the manner in which units 42 are supported is illustrated.

A series of transverse beams 44 and longitudinal beams 46 are provided in frame 22 at the bottom of each level 30A, 30B, 30C and 30D and at the top of level 30D. A series of intermediate columns 48 extend between beams 26 at predetermined intervals. Further, at least one intermediate longitudinal beam 50 extends from each intermediate column 48 toward a column 24. As may be more fully appreciated by also referring to FIG. 7 and FIG. 8 each unit 42 is constructed with a frame 52 having four longitudinal beams 54 and four vertical beams 56 arranged as a solid rectangle. Intermediate beams 58 and intermediate columns 60 are also provided.

Frame 52 is covered internally by a series of panels which make up the floor, walls and ceiling of unit 42. Preferably, there are a series of internal panels which are decorative in nature and a series of external panels which are exposed to the environment. This produces a space (not shown) which may be filled with heat and sound insulating material (not shown).

Each unit 42 may be provided internally with an air temperature control means such as a heater and thermostat or cooling unit as well as appropriate decorative contents. It will be understood that the panels making up the floor will of necessity be of a much greater strength than the panels making up the walls and ceiling so that the floor can support reasonable loads due to the presence of the occupants and furniture. The wall and floor planels may be formed from wood or a aluminum or other relatively light and strong materials which do not rupture easily under shock and vibration and thus do not become heavy falling objects which injure the occupants and contribute to further damage to the structure. Where appropriate, kitchen and toilet facilities may be installed. Each unit 42 will have appropriate conduits or conductors for supplying water, electricity or air of controlled temperature from a central source if each unit 42 is not equipped with its own air conditioning system. Such conduits or conductors are connected to distribution conduits or conductors (not shown) which may be placed at the back of structure 20 after units 42 have been placed therein.

Referring to FIG. 2, each unit 42 may be equipped with removable wall panels 62, removable ceiling panels 64 and removable floor panels (not shown). Corresponding interior and exterior panels would then be removable. The presence of such removable panels allows units 42 to be interconnected by very short passageways to form combinations of continuous living regions in a number of different ways. For example, a unit 42 behind stairwell 34 may be connected to a unit 42 behind a terrace 38 to produce a relatively large one level living area by selective removal of wall panels 62. Alternatively, by selective removal of ceiling panels 64 and floor panels in an adjacent unit, a duplex style multi-level living environment may be created.

While it is possible to construct units 42 of a size that barely fits within rectangular regions in frame 22 for receiving units 42, units 42 would then be supported directly on transverse beams 44 and longitudinal beams 46. This would be adequate for many areas of the world, but would not provide a significant degree of shock and vibration isolation for units 42.

Referring to FIG., 3, units 42 are sized so that shock and vibration isolators 66 are provided between the exterior surfaces of unit 42 and portions of frame 22. Each shock and vibration isolator 66 extend from frame 22 to at least two adjacent exterior surfaces of unit 42. Preferably, a plurality of isolators 66 extend from portions of frame 22 so as to contact every exterior surface of unit 42. Contact between isolators 66 and each exterior surface of unit 42 is preferably made in a manner so that that a portion of frame 52 is contacted directly by isolator 66. Suitable openings in exterior panels of unit 42 may be provided for this purpose. If such openings are not present, isolators 66 should be positioned to contact exterior panels of unit 42 at positions having direct underlying support from frame 52.

In addition to isolators 66, stabilizing members 68 and stabilizing members 70 may be provided. Stabilizing members 68 are of substantially frusto-conical shape and may extend from a transverse beam 44 to lower exterior surface 42A of unit 42. Stabilizing members 70 may be cylindrical in shape and may extend from intermediate columns 48 to exterior surfaces 42B and 42C of unit 42.

Stabilizing members 68 and 70 may be formed of safety glass, wood, plastics or ceramics. However, stabilizing members 68 and 70 are preferably formed of a hard rubber which deforms slightly under stress. Stabilizing members 68 and 70 are sized so that they are under compression when forced between exterior surfaces of units 42 and portions of frame 22.

Figure 3:
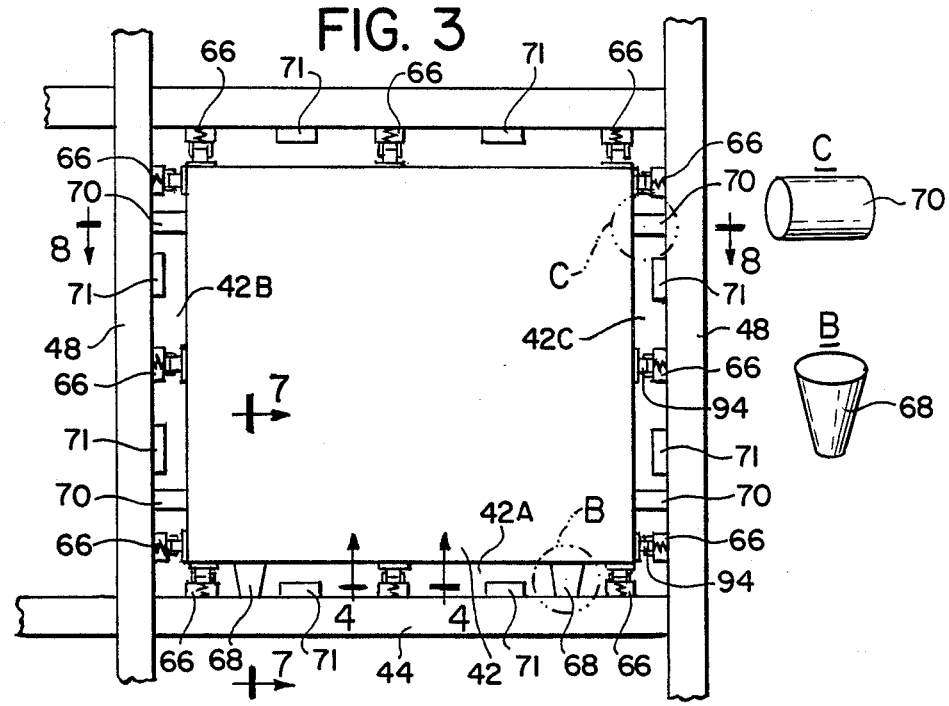
FIG. 3 is a partial cross-sectional view taken along line 3—3 of FIG. 1.

When structure 20 remains undisturbed by shock or vibration due to major earthquakes, or is subjected only to small amounts of shock and vibration due to minor earth tremors, support members 68 and 70 remain in place. However, during severe earthquakes, isolators 66 permit relative motion between units 42 and frame 22 as more fully described below. Under these conditions, stabilizing members 68 and 70 are either deformed, if made of a deformable material, or destroyed if made of a frangible material. Thus, stabilizing members 68 and 70 fall away from their normal positions illustrated in FIG. 3 to positions in which stabilizing members 66 and 70 no longer contact both frame 66 and the exterior surface of unit 42. For example, stabilizing members 68, because of their frusto-conical shape, tend to fall over leaving the lower exterior surface 42A of unit 42 supported only by isolators 66. Stabilizing members 70, held between an intermediate column 48 and a side exterior surface 42B or 42C of unit 42 tend to fall when the distance between an intermediate column 48 and an exterior surface 42C or 42B is increased. Once having fallen away, stabilizing members 70 are not at a position where the motion of unit 42 with respect to frame 22 can be stabilized.

A plurality of bumpers 71 are provided on portions of frame 22 extending toward, but not reaching, the exterior surfaces of units 42. When stabilizing members 68 and 70 have moved to positions where they are no longer effective, bumpers 71, serve to limit the motion of units 42 within frame 22. Bumpers 71 may be formed from any resilient material so as to absorb shock and vibration and limit the motion of unit 42 so that the motion of second member 80 of each isolator 66 (FIGS. 4,5) with respect to first member 72 is not exhausted, thus preventing isolators 66 from "bottoming out".

Figure 8:
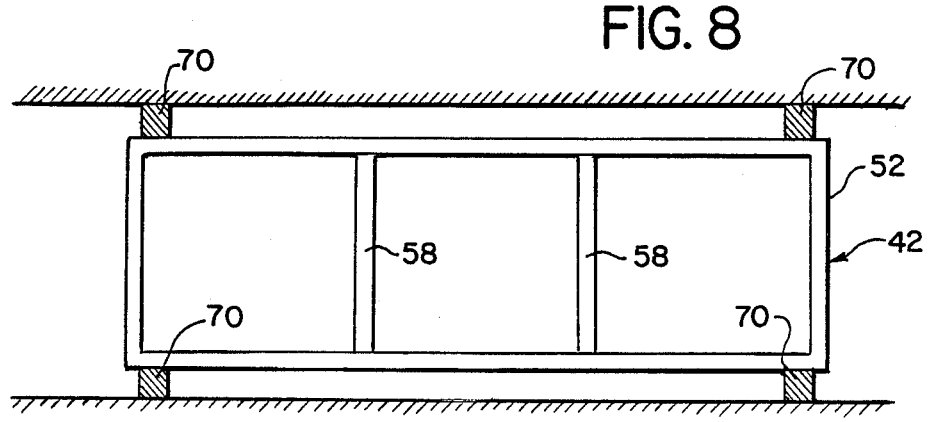
FIG. 8 is a schematic partial cross-sectional view of the embodiment of the invention taken along line 8—8 of FIG. 3.

Positioning of stabilizing members 68 and of stabilizing members 70 is illustrated in FIG. 7 and FIG. 8 respectively.

While a relatively small number of isolators 66 are used between frame 22 and lower exterior surface 42A of unit 42, it is possible to utilize a much larger number. In this case, a virtual bed of isolators 66, each supporting a much diminished fraction of the total weight of unit 42, would be used. In a like manner, the total number of stabilizing members 68 can also be varied.

FIGS. 4 and 5 illustrate one embodiment of isolator 66. A first member 72 having the general shape of a cylinder with a flange 74 is attached to beam 44 by a series of bolts 76. First member 72 has a annular radially inwardly extending lip 78 defining a circular opening in first member 72. A second member 80 has a cylindrical portion 82 sized to fit within the opening defined by lip 78. An outwardly extending flange 84 on cylindrical portion 82 engages lip 78 thus preventing cylindrical portion 82 of second member 80 from being entirely forced from first member 72 under the action of a spring 86 which bears against an internal lower surface 88 of second member 80.

Second member 80 also has two integral generally triangular shaped projections 90 extending upwardly from a top flange 92. A roller 94 is supported between portions 90 by a shaft 96 extending into bearings 98 in projections 90. Thus, isolators 66 in addition to absorbing shock and vibration, also each provide a roller so that unit 42 may be rolled into position within frame 22 and removed therefrom as more fully described with respect to FIG. 9 below.

FIG. 6 illustrates an alternate embodiment of the isolator of FIG. 4 and FIG. 5. The operation of isolator 66A is similar in principle to the operation of isolator 66 and like components have been given like reference numerals. However, second member 80A is integrally formed with a conical section 100 extending from external flange 92A. An integrally formed frusto-conical section 102 extends from conical section 100. Frusto-conical section 102 has an opening therein configured to receive ball 104. The surface of ball 104 and the surface of the opening in frusto-conical section 102 which receives ball 104 are suitably treated so that the friction between said surfaces is low and so that ball 104 can therefore rotate within section 102. Thus, isolator 66A, due to the action of spring 86A performs the shock and vibration isolation function of isolator 66 and provide a rolling surface to assist in placing units 42 in frame 22.

Figure 9:
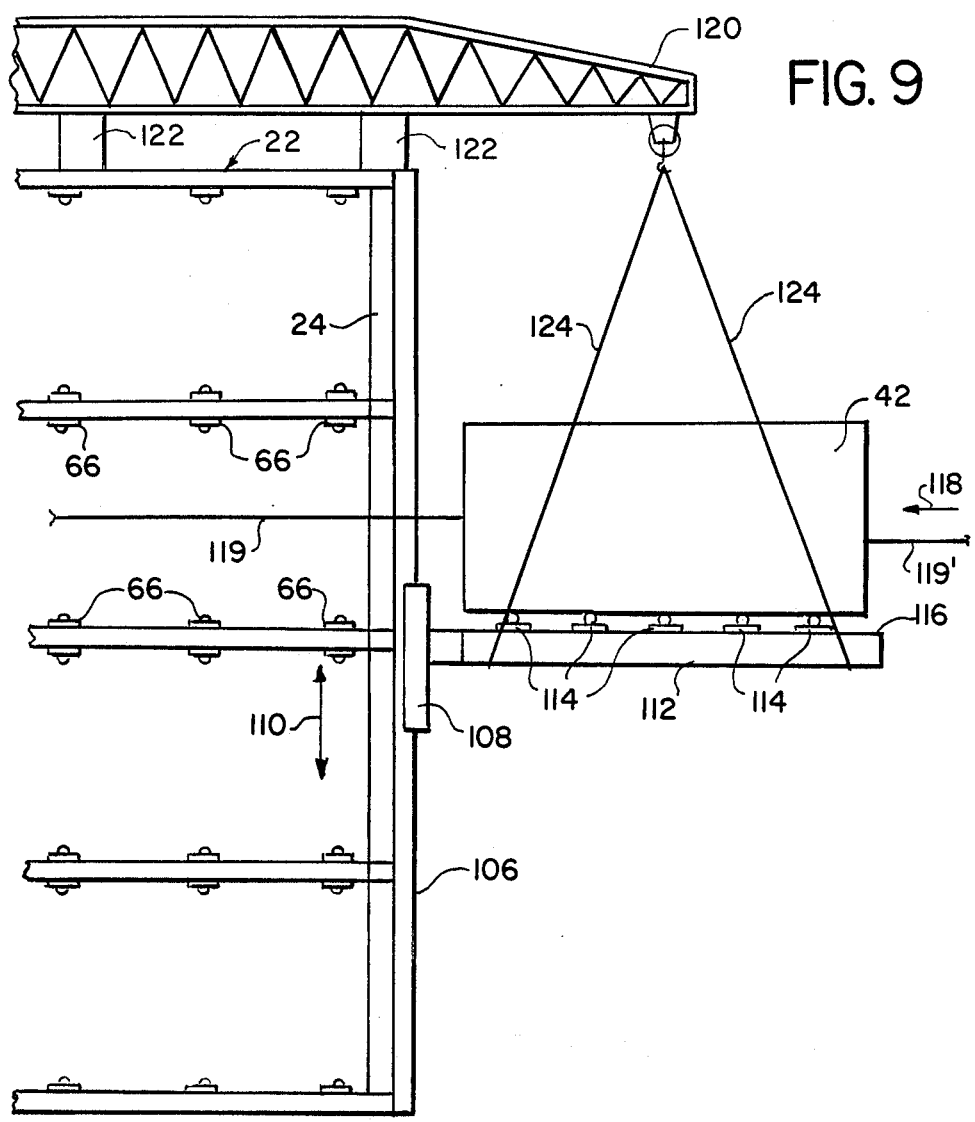
FIG. 9 is a side elevational view illustrating assembly of the invention of FIG. 1.

FIG. 9 depicts a hoist elevator arrangement for lifting units 42 to proper heights for being placed in frame 22. A vertical rail 106 which may be in the form of an I beam is attached to the side of frame 22. A guide member 108 is captively retained on rail 106 so that it can move up and down as represented by double arrow 110. Suitable rollers may be provided to reduce friction between rail 106 and guide means 108, as is well known in the art.

A pallet like carrier 112 is affixed to guide means 108 and moves up and down with guide means 108. A series of roller assemblies 114 is provided on upper surface 116 of carrier 112 to permit motion of unit 42 in the direction represented by arrow 118. Unit 42 may be caused to move into frame 22 by means of a cable 119 which may be temporarilly attached thereto to allow unit 42 to be pulled into frame 22.

A crane assembly 120 is mounted to the top of frame 22 by support members 122 which may be configured so as to move in a track (not shown). Alternatively, support members 122 may be fixed to frame 22. Cables 124 extend from crane 120 to carrier 112. When crane 120 is operated so as to roll in cables 124, carrier 112 is lifted and its position controlled by guide means 108 sliding along vertical rail 106. When carrier 112 has arrived at a proper height due to the action of crane 120 in rolling in cables 124, unit 42 may be rolled off platform 112, under the action of cable 119, and into frame 22 thus compressing springs 86 in isolators 66 upon contact of isolator 66 with external surfaces of unit 42. It will be understood that at this time stabilizing members 68 and 70 are not yet in place, but are inserted after units 42 are placed in their proper positions within frame 22.

When crane 120 has serviced a given column of units 42, it may be repositioned as by moving support members 122 along the above mentioned track to service another column of units 42.

It will be understood that once unit 42 has been placed in its proper position within frame 22, an additional frame member 49 (FIG. 2) having thereon several isolators 66 for contacting an external surface of unit 42 is installed on frame 22 to secure unit 42 in place. However, 49 member may be bolted rather than welded to facilitate future removal of a unit 42 for servicing or for refurbishing of the interior thereof. Removal of a unit 42 may be effected by utilizing crane 120, guide means 108, and carrier 112. The member bolted in to close frame 22 is then removed and a cable 119' may be attached to unit 42 to provide a means for pulling unit 42 out of frame 22 and on to carrier 112. Carrier 112 may tnen be lowered to ground level where unit 42 may then be rolled on to a truck or other vehicle for transport. Unit 42 may be sent back to the factory for repair or to apply new decorations, or may be transported as a trailer to a different structure 20 in another region to which the owners wish to move.

Several additional isolators which may be used with the present invention are ilustrated in FIG. 10, FIG. 11, FIG. 12 and FIG. 13. These isolators may be used between the external surfaces of a unit 42 and parts of frame 22 without any intermediate roller means. In this case, units 42 would be temporarily positioned in their proper places within frame 22 while the isolators were installed. Any positioning means utilized during the installation would then be removed.

Referring to FIG. 10, a spring 126 is captured between a bottom plate 128 which may be a portion of frame 22 and a top plate 130 which may be associated with a unit 42. Spring 126 is surrounded by a flexible and resilient collar 132 which is perferably formed of a relatively stiff elastomeric material. Extending circumferentially and internally in collar 132 is a fluid pocket 134 which may be made of a series of torus shaped regions 136 interconnected by annular regions 137. The presence of fluid in pocket 134 tends to dissipate mechanical energy so as to absorb shock and vibration.

Collar 132 is secured to member 130 by a tightly fitting flange 138 secured to member 130 by bolts 140. A tightly fitting lower flange 142 surrounds the lower end of collar 132 in a manner similar to that of flange 138. However, flange 142 is not secured to member 128.

A shock absorber 150 of the conventional fluid type may also be included. Shock absorber 150 has an upper portion equipped with a rod 152 and a lower portion equipped with rod 154. A ball 156 is located at the end of rod 152. A ball 158 is located at the end rod 154. An upper plate 160 is affixed to member 130 and has an opening for receiving ball 156. A lower plate 162 is affixed to member 128 and also has a opening therein for receiving ball 158. Thus, shock absorber 150 helps to absorb shock and vibration. Further, some motion from side to side of member 128 with respect to member 130 is permitted in view of the manner in which spring 126, collar 134 are mounted with respect to members 128 and 130.

The embodiment of the invention illustrated in FIG. 11 is similar in many respects to the embodiment illustrated in FIG. 10. However, collar 134A has upper flange 164 and lower flange 166 at its upper and lower ends respectively. Upper retaining flange 168 and lower retaining flange 170 have annular grooves 172 and 174 for receiving flanges 164 and 166 respectively. Further, an outlet tube 176 may be provided to allow fluid to enter and leave pocket 136. Thus, energy imparted to fluid in pocket 136 may be dissipated in an external damping reservoir (not shown).

The operation of the isolator illustrated in FIG. 11 is different from that of the embodiment of FIG. 10 in that the apparatus of FIG. 10 may be used in both compression and tension because collar 134A is fixedly connected to both members 128 and 130.

It will be noted that shock absorber 150 should be of the type having a spring which tends to bias shock absorber 150 toward it fully extended position, thus retaining balls 156 and 158 in plates 160 and 162 respectively.

Figure 12:
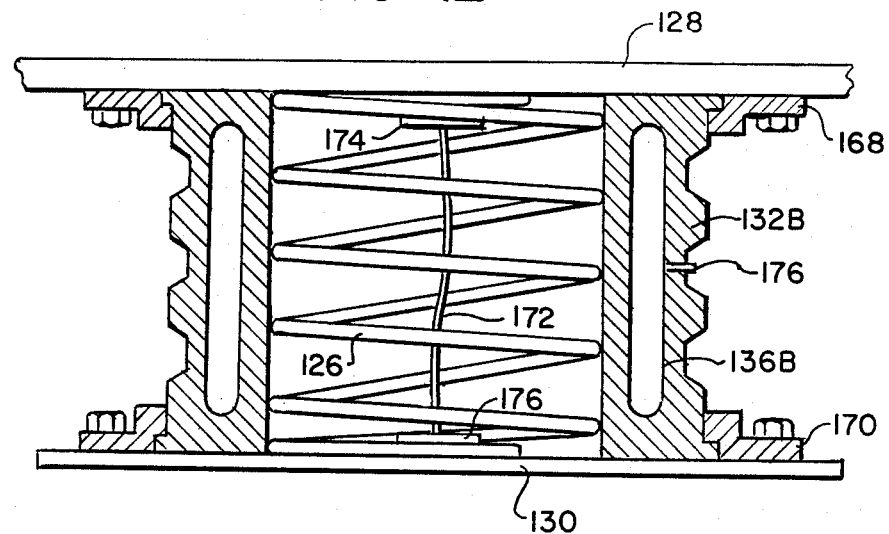
FIG. 12 is a further embodiment of a component for use with the invention of FIG. 1.

Referring to FIG. 12, a shock and vibration isolator having components similar to those in FIG. 11 is illustrated. A collar 132B secured at its upper end to member 128 and at its lower end to member 130 has an internal pocket 136B extending around its circumference. Pocket 136B has an elongate cross-section rounded at its ends. A tube 176 is provided to allow fluid to enter and leave pocket 136B in a manner similar to that discussed above with respect to FIG. 11.

FIG. 12 differs from FIG. 11 in that instead of using a shock absorber, a wire rope or cable 172 is secured to member 128 by plate 174 and to member 130 by a plate 176. Plates 174 and 176 are securely affixed to plates 128 and 130. Further, each end of 172 is treated in some fashion so that it can be held by plates 174 and 176. For example, a ball (not shown) having a diameter greater than that of cable 172 may be attached to each end thereof. Plates 174 and 176 may have holes therein of sufficient diameter to allow cable 172 to pass through while not permitting the balls affixed to the ends thereof to pass through, thus affixing the ends of cable 172 to member 128 and 130 Alternatively, cable 172 may simply be clamped to members 128 and 130 by plates 174 and 176 which may be secured to members 128 and 130 respectively by bolts (not shown).

In operation cable 172 is selected to have a length so it is not in tension when structure 20 is not disturbed by shock or vibration. Thus, limited motion of units 42 within structure 20 is possible before tension is induced in cable 172. After such limited motion, relative motion of unit 42 with respect to frame 22 will be restrained until the shock and vibration becomes severe enough to cause cable 172 to be ruptured. Spring 126 and collar 132B then provide shock and vibration damping. If ruptured, cable 172 may be replaced after an earthquake has occurred.

Alternatively, to provide stabililty, and eliminate the use of stabilizing members 68 and 70, cables 172 can be selected so that there is a slight tension therein when structure 20 remains undisturbed by shock and vibration. Severe shock and vibration will again serve to rupture cable 172 allowing spring 126 and collar 132B to dissipate shock and vibration.

Figure 13:
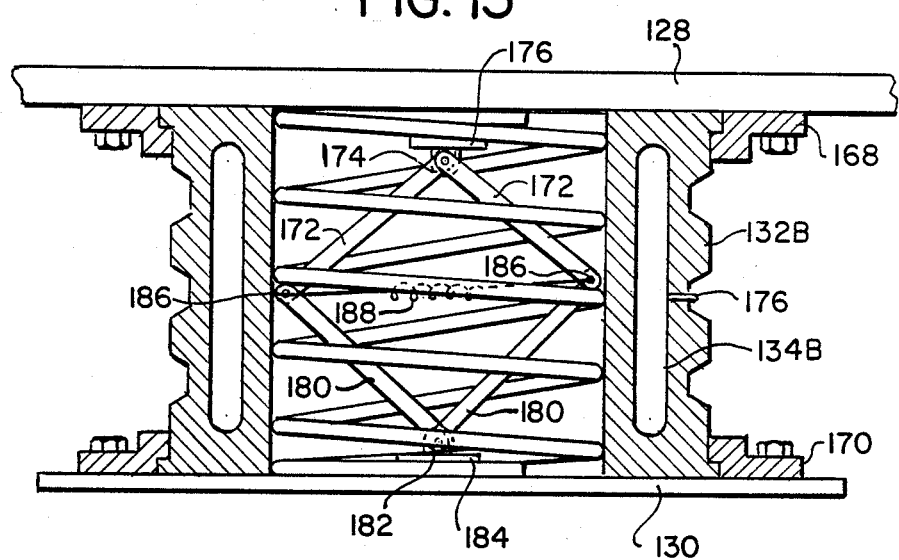
FIG. 13 is yet another embodiment of a component for use with the invention of FIG. 1.

The shock and vibration isolator illustrated in FIG. 13 is similar to that illustrated in FIG. 11. However, the shock absorber is replaced by a system of levers. A pair of upper levers 172 are pivotally connected at their upper ends to a ball 174 which fits into a socket in a plate 176 affixed to member 128. A pair of lower levers 180 are pivotally connected to each other and to a ball 182 received in a socket in a plate 184 affixed to member 130. The ends of levers 172 remote from ball 174 are each affixed to an end of one of levers 180 remote from the ends thereof pivotally connected to ball 182. Thus, pivoting occurs at points 186. A spring may extend between points 186 to cause the lever system made of levers 172 and 180 to extend to maximum height thus firmly seating balls 174 and 182 in socket in plates 176 and 184 respectively.

The operation of the isolator illustrated in FIG. 13 is similar to that of the one in FIG. 11. However, the lever system bears against points on the inner diameter of collar 132B thus causing additional turbulence in the fluid contained in pocket 134B and further serving to dampen shock and vibration.

Various modifications of the invention are possible. For example, a seismic alarm system such as that disclosed in the U.S. Pat. No. 4,300,135 to Korn et al. may be installed to alert the occupants to evacuate structure 20 at the start of the earthquake. An alternative earthquake detector may include an apparatus having a coil and permanemt magnets which undergo relative motion during even minor earthquakes to generate an electromotive force in the coil which is sensed by a detector circuit.

In addition, the lower level of structurer 20 may be configurerd as a garage for automobiles rather than as a living area. In this case, a very shallow ramp would be provided for driving from ground level to the level of the floor of units 42 on the lower most level of structure 20. The floors of units 42 on said most lower level would also be reinforced to support the weight of one or more automobiles housed therein. In addition, appropriate garage doors would be provided and removable members of frame 20 would be positioned so as to avoid acting as an obstruction when the automobile is driven into a unit 42.

It should be noted that the term living units as used herein refers to units generally, which may in fact be used as living areas or for storage for housing vibration sensitive equipment such as computers, military hardware, equipment for use in space or as a simple garage space. Thus, the term living units, as used herein is not limited to units being used by human occupants. In this regard, it should be noted that units 42 have been shown without windows which generally would not be appropriate for living areas designed for human occupants. However, units 42 may also be provided, at appropriate locations, with windows, thus making the living areas defined by units 42 more desirable.

It is also noted that a structure of the a type described herein may be used to provide a vehicle for transporting shock and vibration sensitive equipment from one location to another. A frame containing a plurality of units 22 can be mounted on a carrier having wheels. This carrier can be coupled to a suitable locomotion means such as a tractor used with common tractor-trailer assemblies in the trucking industry. However, for such applications stabilizing members 68 and 70 would not be used to avoid having the contents exposed to normal shock and vibration resulting from poor roads.

In addition, to facilitate such transport or storage of highly sensitive equipment, each unit may contain within it a smaller unit which is isolated from its internal surfaces by a plurality of shock and vibration isolation means. This smaller unit may in turn contain still another still smaller unit isolated from the smaller unit by a further pluralilty of shock and vibration isolation means. In this case the use of stabilizing members 68 and 70 between successively smaller units may also be inappropriate.

It will thus be seen that the objects set forth above, among those made apparent fromt he preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween.

What is claimed is:

1. A shock and vibration resistant structure comprising:
    a frame having a plurality of substantially rectangular regions therein;
    a plurality of modular units each adapted to be positioned removably and replaceably in one of said regions, each of said modular units having a lower external surface, side external surfaces and a top external surface, said frame having means for temporary removal of a selected portion thereof to permit access to each of said regions for placement in or removal from each of said regions of the one said modular unit positioned therein;
    a plurality of shock and vibration isolation means for protecting said modular units from externally generated shock and vibration, each of said shock and vibration isolation means being fixedly mounted on, and projecting into each of said regions from, portions of said frame, said isolation means extending toward and contacting at least two adjacent said external surfaces of each of said modular units for resilient engagement therewith, one of said adjacent external surfaces being horizontal whereby when the shock and vibration resistant structure is subjected to externally generated shock and vibration forces, each of said modular units is resiliently restrained in both horizontal and vertical directions by said isolation means.

2. The shock and vibration resistant structure of claim 1, wherein said plurality of shock and vibration isolation means comprise at least one said isolation means extending from said frame toward and contacting each and every external surface of said modular units for resilient engagement therewith.

3. The shock and vibration absorbing structure of claim 1, wherein said plurality of shock and vibration isolation means each comprises:
    a spring extending from said frame to one of said exterior surfaces ; and
    a flexible resilient collar surrounding said spring.

4. The shock and vibration absorbing structure of claim 3, wherein said collar has an internal pocket extending about said collar, said internal pocket being filled with a fluid.

5. The shock and vibration absorbing structure of claim 4, further comprising means for conducting said fluid into and out of said pocket.

6. The shock and vibration absorbing structure of claim 3, further comprising a shock absorber extending between said frame and said exterior surface.

7. The shock and vibration absorbing structure of claim 6, wherein said shock absorber has a first part and a second part, a first rod extending from said first part, a second rod extending from said second part, a first ball at an end of said first rod removed from said first part, a second ball at an end of said second rod removed from said second part, further comprising a socket means affixed to said exterior surface for receiving said first ball and a socket means affixed to said frame for receiving said second ball.

8. The shock and vibration absorbing structure of claim 3 further comprising a first retaining ring surrounding said collar and means for affixing said first retaining ring to one of said exterior surfaces.

9. The shock and vibration absorbing structure of claim 8, wherein said shock and vibration absorbing means further comprises a second retaining ring affixed to said collar at an end thereof adjacent said frame, said second retaining ring surrounding said collar.

10. The shock and vibration absorbing structure of claim 3, wherein said collar has a first flange for contacting one of said exterior surfaces and a second flange for contacting said frame.

11. The shock and vibration absorbing structure of claim 10, further comprising a first retaining means for securing one of said first flange to said exterior surfaces and a second retaining means for securing said second flange to said frame.

12. The shock and vibration absorbing structure of claim 11, further comprising a shock absorber extending between one of said frame and said exterior surfaces.

13. The shock and vibration absorbing structure of claim 11, wherein said shock absorber has a first part and a second part, a first rod extending from said first part, a second rod extending from said second part, a first ball at an end of said first rod removed from said first part, a second ball at an end of said second rod removed from said second part, further comprising a socket means affixed to said one of exterior surfaces for receiving said first ball and a socket means affixed to said frame for receiving said second ball.

14. The shock and vibration absorbing structure of claim 10, wherein said shock and vibration isolation means further comprises a wire extending from said one of exterior surfaces to said frame, first securing means for securing a first end of said wire to said external surface and second securing means for securing a second end of said wire to said frame.

15. The shock and vibration absorbing structure of claim 14, wherein said wire is selected to be of a length equal to or larger than the distance between said first securing means and said second securing means when said structure remain undisturbed by shock and vibration.

16. The shock and vibration absorbing structure of claim 3, further comprising motion limiting means, said motion limiting means includes a first pair of levers pivotally connected to one another at first ends thereof, pivot means for pivotally securing said first ends to one of said exterior surfaces, a second pair of levers pivotally secured to one another at first ends thereof, pivot means for pivotally securing said first ends of said second pair of levers to said frame, a second end of each of said first pair of levers being pivotally connected to a second end of one of said second pair of levers at connection points thereof so that a change in distance between said exterior surface and said frame causes a corresponding and opposite change in distance between said connection points.

17. The shock and vibration absorbing structure of claim 16, wherein said pivoting means each comprises a ball and a socket for said ball, one of said ball and socket being affixed to said exterior surface and said portions of said frame, the other of said ball and socket being affixed to said first pair of levers and said second pair of levers at said first ends thereof.

18. The shock and vibration absorbing structure of claim 1 further comprising elevator means affixed to an external side of said frame, said elevator means being for lifting said units so that said units may be transferred horizontally from said elevator means to said frame, said elevator means including a carrier means for receiving one of said units said carrier means including roller means for supporting said units so that said units may be rolled from said carrier means to said regions in said frame for receiving said units when said carrier means is at a predetermined height with respect to said frame.

19. The shock and vibration absorbing structure of claim 18, wherein said elevator means comprises:
rail means extending vertically along a side of said frame;
guide means connected to said carrier means for moving along said rail means;
holding means for preventing said guide means from leaving said rail means;
moving means for causing said elevator means to move up and down along the side of said structure.

20. The shock and vibration absorbing structure of claim 19, wherein said moving means comprises a crane means affixed to said structure at the top thereof and cable means extending from said crane means to said carrier means.

21. The shock and vibration absorbing structure of claim 1, further comprising bumper means extending from said portions of said frame toward said external surfaces.

22. The shock and vibration absorbing structure of claim 21, wherein said bumper means extend a distance from said portions of said frame less than that of said isolation means.

23. The shock and vibration absorbing structure of claim 1, further comprising second units supported within said first units, and shock and vibration isolation means for isolating said second units from said units supported in said frame.

24. The shock and vibration resistant structure of claim 1, wherein said units each comprise:
a frame, and
a plurality of panels mounted to said frame so as to define a substantially closed space;
at least one of said panels being removably attached to said frame.

25. The unit of claim 24 further comprising interconnecting means for interconnecting said unit to an adjacent unit.

26. The unit of claim 25, wherein said interconnecting means comprises a passageway between said units.

27. The shock and vibration resistant structure of claim 1, wherein each of said plurality of shock and vibration isolation means comprises:
a first member;
biasing means for urging said first member in a direction away from said frame; and
rolling means operatively associated with and rotatably mounted on said first member, said rolling means being adapted to contact one of said external surfaces, said rolling means and said external surfaces being so configured that said modular units can be moved without restraint over said shock and vibration isolation means in either of two mutually perpendicular directions each of which being respectively perpendicular to a direction of the extension of one of said shock and vibration isolation means from said frame.

28. The shock and vibration resistant structure of claim 27, wherein said rolling means is the only portion of said shock and vibration isolation means contacting said external surfaces.

29. The shock and vibration resistant structure of claim 27, wherein said external surfaces are planar.

30. The shock and vibration resistant structure of claim 27, wherein said plurality of said shock and vibration isolation means each further comprises:
a second member fixedly attached to a portion of said frame, said second member having an opening therein, said first member being capable of having a portion thereof received in said opening in said second member, so that said first member is movable to and away from said frame; and retaining means for limiting motion of said first member so that said first member is not completely removable from said opening in said second member.

31. The shock and vibration absorbing structure of claim 30, wherein said rolling means comprises: a spherical ball, said second member having an opening wherein said ball member is retained for unrestricted universal rotation.

32. The shock and vibration resistant structure of claim 1, wherein another of said two adjacent external surfaces of said units is vertical.

33. A shock and vibration resistant structure comprising:
   a frame having a plurality of substantially rectangular regions therein;
   a plurality of modular units each adapted to be positioned removably and repaceably in one of said regions, each of said units having a lower external surface, side external surfaces and a top external surface; and
   a plurality of shock and vibration isolation means for isolating said units from shock and vibration, each of said shock and vibration isolation means being fixedly attached to , projecting into each of said regions extending from portions of said frame toward and contacting at least two adjacent said external surfaces of each of said units, one of said adjacent surfaces being horizontal, said shock and vibration means each further comprising:
   a first member;
   a second member fixedly attached to a portion of said frame, said second member having an opening therein, said first member being capable of having a portion thereof received in said opening in said second member so that said first member is movable to and away from said frame;
   biasing means for urging said first member in a direction away from said frame;
   retaining means for limiting motion of said first member so that said first member is not completely removable from said opening in said second member; and
   rolling means operatively associated with and rotatably mounted on said first member, said rolling means being adapted to contact one of said external surfaces, said rolling means and said external surfaces being so configured that said modular units can be moved without restraint over said shock and vibration isolation means in either of two mutually perpendicular directions each being respectively perpendicular to a direction of the extension of each of said shock and vibration isolation means from said frame, so that said modular units may be moved horizontally in an unrestrained manner with respect to said frame when selected members of said frame adjacent said regions are removed in the direction of said removed frame members, whereby said units may be placed selectively in and removed from said frame.

34. A shock and vibration resistant structure comprising:
   a frame having a plurality of substantially rectangular regions therein;
   a plurality of modular units each adapted to be positioned in one of said regions, each of said units having a lower external surface, side external surfaces and a top external surface;
   a plurality of shock and vibration isolation means for isolating said units from shock and vibration, said shock and vibration isolation means extending from portions of said frame toward at least two adjacent said external surfaces of each of said units; and
   elevator means for lifting said units so that said units may be transferred horizontally from said elevator means to said frame, said elevator means including carrier means comprising roller means for supporting said units so that said units may be rolled from said carrier means into said regions in said frame for positioning said units therein when said carrier means is at a predetermined height with respect to said frame.

35. A shock and vibration resistant structure comprising:
   a frame having a plurality of substantially rectangular regions therein;
   a plurality of modular units for being received in said regions, said units having a lower external surface, side external surfaces, and a top external surface;
   a plurality of shock and vibration isolation means for isolating said units from shock and vibration, said shock and vibration isolation means extending from portions of said frame toward at least two adjacent external suraces of said units; and
   stabilizing members extending from portions of said frame to each of said external surfaces, said stabilizing members being sized and shaped so that said stabilizing members are held captive in first positions between said portions of said frame and said external surfaces when said structure is not subjected to shock or vibration, and so as to fall away from said first positions when said structure undergoes shock or vibration, said stabilizing members falling to second positions wherein said stabilizing members are not held captive between said portions of said frame and said external surfaces.

36. The shock and vibration resistant structure of claim 35, wherein said stabilizing members are of substantially frusto-conical shape.

37. The shock and vibration resistant structure of claim 35, wherein said stabilizing members are of substantially cylindrical shape.

* * * * *